July 23, 1957 G. L. WEST ET AL 2,800,323
DOOR-OPERATING SYSTEM
Filed Oct. 2, 1951 9 Sheets-Sheet 1

INVENTORS
GEORGE L. WEST
ANDREW E. KUNZL
BY GLENWOOD M. BROWN
Oscar L. Spencer
ATTORNEY July 23, 1957

G. L. WEST ET AL 2,800,323

DOOR-OPERATING SYSTEM

Filed Oct. 2, 1951

INVENTORS
GEORGE L. WEST
ANDREW E. KUNZL
BY GLENWOOD M. BROWN

Oscar L. Spencer
ATTORNEY

INVENTORS
GEORGE L. WEST
ANDREW E. KUNZL
BY GLENWOOD M. BROWN
Oscar L. Spencer
ATTORNEY July 23, 1957  G. L. WEST ET AL  2,800,323
DOOR-OPERATING SYSTEM
Filed Oct. 2, 1951  9 Sheets-Sheet 6

INVENTORS
GEORGE L. WEST
ANDREW E. KUNZL
BY GLENWOOD M. BROWN
Oscar L. Spencer
ATTORNEY July 23, 1957 G. L. WEST ET AL 2,800,323
DOOR-OPERATING SYSTEM
Filed Oct. 2, 1951 9 Sheets-Sheet 7

INVENTORS
GEORGE L. WEST
ANDREW E. KUNZL
BY GLENWOOD M. BROWN
Oscar L. Spencer
ATTORNEY July 23, 1957

G. L. WEST ET AL 2,800,323

DOOR-OPERATING SYSTEM

Filed Oct. 2, 1951

INVENTORS
GEORGE L. WEST
ANDREW E. KUNZL
BY GLENWOOD M. BROWN
Oscar L. Spencer
ATTORNEY

United States Patent Office 2,800,323
Patented July 23, 1957

2,800,323

DOOR-OPERATING SYSTEM

George L. West, Pittsburgh, Pa., and Andrew Edward Kunzl and Glenwood M. Brown, Marshall, Mich., assignors to Pittsburgh Plate Glass Company Application October 2, 1951, Serial No. 249,346

26 Claims. (Cl. 268—66)

This invention is described as embodied in a power-operated door incorporating advantageous automatic features, but which can be adjusted readily for different modes of operation and which remains sufficiently under the manual control of the user to provide maximum operating efficiency under widely different conditions of use.

Automatic power-driven doors have been used heretofore to a relatively limited extent. Their use has been limited in part by their high cost and the difficulty of installing and maintaining such door-operating systems and also by other disadvantages that have rendered them unsuitable for many applications.

The operating cycle best suited for a door in substantially continuous use is not necessarily the best mode of operation for the same door during periods when it is used only occasionally. Door-operating systems, therefore, that have an inflexible operating cycle are limited in use to the particular applications in which their pre-fixed operating characteristics are acceptable.

In the door-operating system incorporating the present invention, wide variations in operating characteristics can be attained by simple adjustments of the control mechanisms, and the door, although power-operated, is under manual control to such extent that it responds efficiently to widely varied traffic conditions.

In a preferred embodiment of the invention, no operating power is applied to the door until it is manually displaced from its closed position, at which time the door is opened automatically in the direction of the initial displacement. Moreover, the movement of the door can be interrupted at any time by the person using the door by the application of a slight force to the door handle in a direction opposite to the direction of the motion of the door.

The operation of the door is so smooth and gentle that one passing through the doorway has the confidence of complete control over the operation of the door. Thus, not only is the door-operating system arranged to prevent injuries to people using the door, but its characteristics are such as to prevent fear of such injuries. This latter factor is of particular importance to business organizations in which power-driven doors are provided for the use of customers.

In many locations, particularly where it is desired to modify existing doorways, only limited space is available adjacent the door for the installation of the driving mechanism, and in many instances, it is undesirable to have exposed levers or other unsightly door-operating mechanisms.

In accordance with the present invention, a compact easily-concealed door-operating mechanism is provided that can be used in conjunction with remotely-positioned power-generating and control apparatus. This door-operating mechanism is adapted to open a swinging door in either direction, but it does not require more space for operating parts adjacent the door than is required for opening a door in only one direction.

These and other aspects, objects, and advantages of the present invention and the combinations and arrangements of elements by which they are achieved in a preferred embodiment of the invention will be apparent from the following description, considered in conjunction with the accompanying drawings, in which:

Figures 4 to 21 show certain of the components suitable for use in the system indicated diagrammatically in Figure 2.

*General arrangement (Figure 1)*

Figure 1:
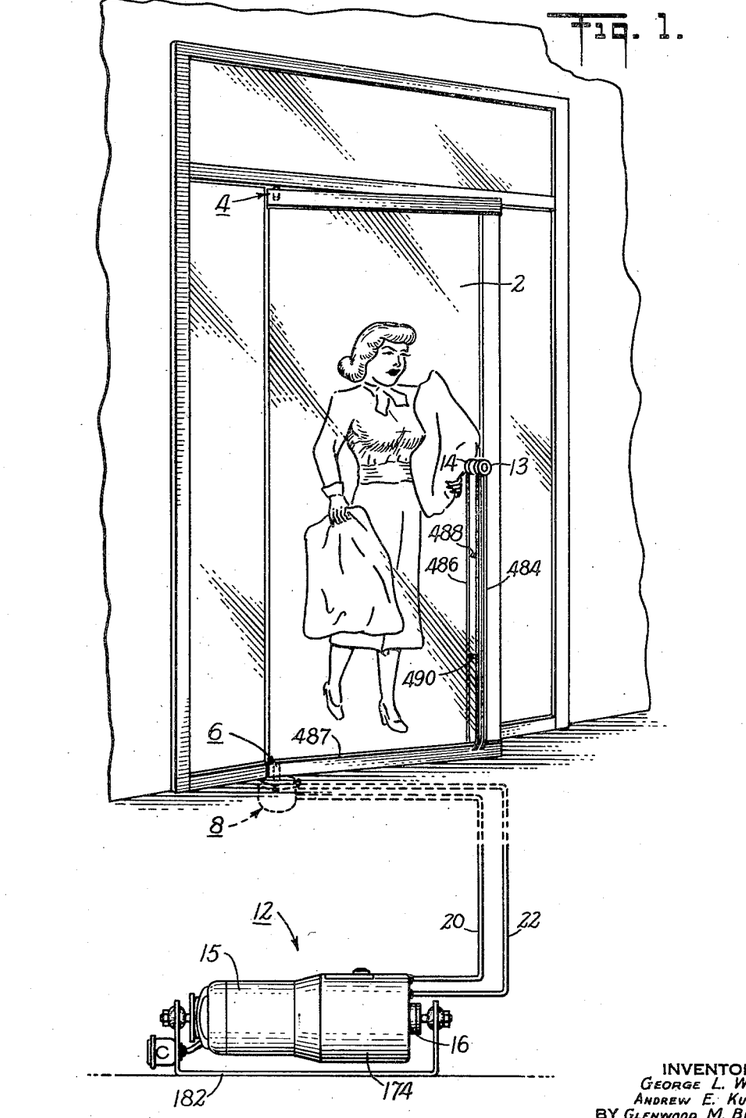
Figure 1 is a perspective view of a power-operated plate glass door and a diagrammatic representation of the power driving mechanism.

As shown in the drawing, a power-driven plate glass door 2 is supported at its top and bottom by hinges or pivots, generally indicated at 4 and 6, respectively.

In order to apply power for driving the door in either direction, a torque generator, in the form of a hydraulic motor generally indicated at 8, preferably positioned in or beneath the floor under the door, is connected to the door through a short hinge-drive or torque-transmitting member which engages and locks with a hinge pin that is rigidly secured to and extends downwardly from the door 2. This hydraulic motor 8 is operated by a hydraulic power unit, generally indicated at 12.

The hydraulic power system for operating the door is controlled by means of a switch mechanism, concealed within an inside door handle 13, and by a door displacement-sensing means positioned beneath the door. This switch mechanism and the displacement-sensing means, both of which will be described in detail later, are arranged so that when the door is displaced slightly from its closed position by pushing or pulling gently upon the inside handle 13, or upon a similar outside handle 14, power is applied to the door by the hydraulic motor 8 to open it in the direction of its initial displacement.

*Mechanical and electrical system and operation (Figures 2 and 3)*

Figures 2, 3:
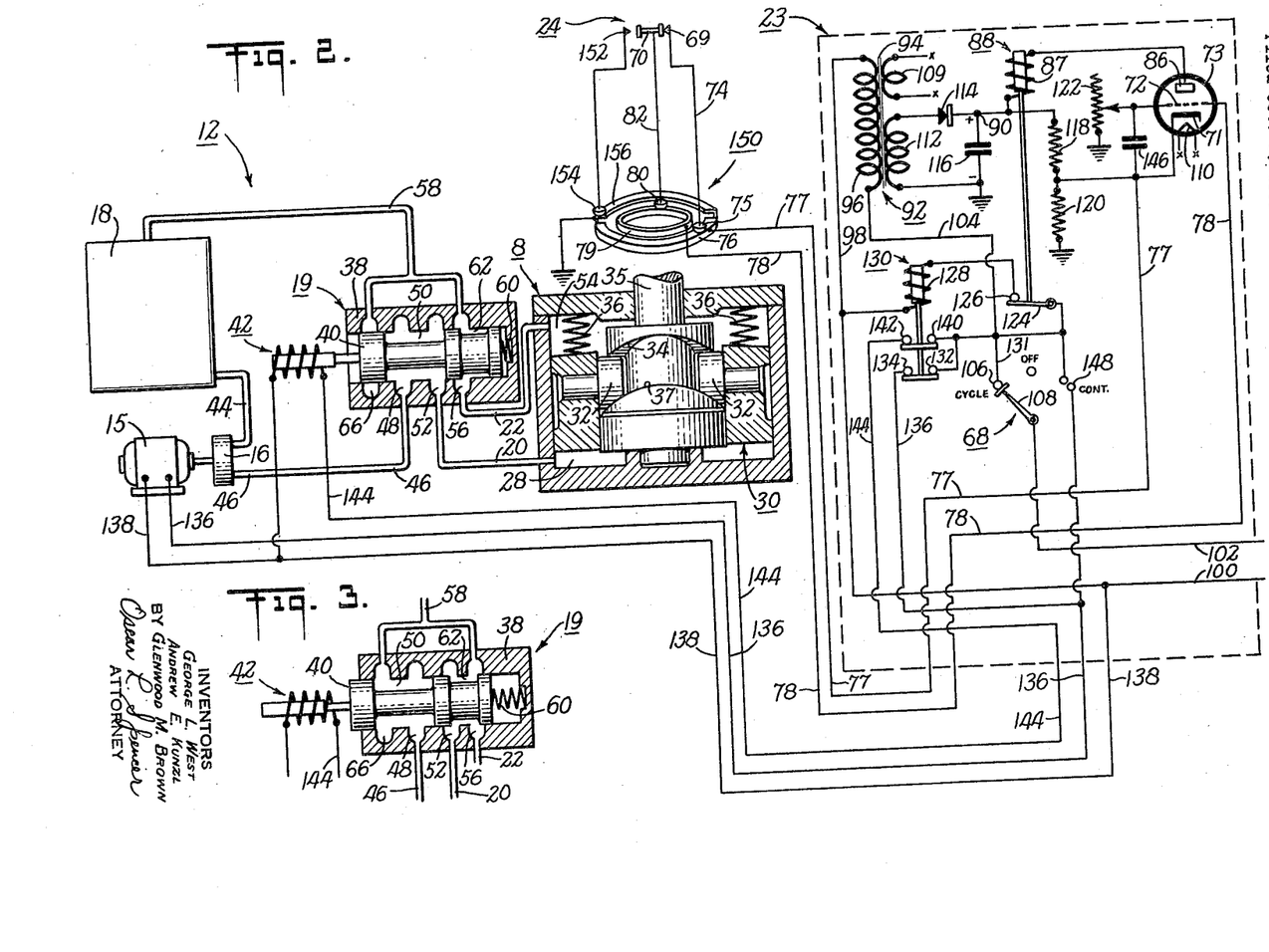
Figure 2 is a diagrammatic representation of a hydraulic system for operating the door shown in Figure 1 including a schematic representation of the electrical control and operating circuits.
Figure 3 is a diagrammatic representation of a valve for controlling the operation of the hydraulic system of Figure 2, the valve being shown in its release position in this view and in its actuating position in Figure 2.

The electrical control circuits and certain of the components of the operating mechanism of the power-driven door 2 are illustrated diagrammatically in Figure 2.

The hydraulic power unit 12 includes an electric motor 15, a pump 16, an oil reservoir 18, and a solenoid-operated control valve, generally indicated at 19. The hydraulic power is delivered to the hydraulic motor 8 by means of a supply line 20 and a return line 22. The electrical operating circuits, forming a central control unit, for controlling the operation of the system are indicated schematically within the broken line 23.

In operation, a person wishing to pass through the doorway presses one of the handles 13 or 14, completing an electrical circuit through a switch, generally indicated at 24, concealed within the handle 13, and at the same time moving the door from its closed position a slight distance in the direction in which the door is to be opened. The central control unit 23 then starts the motor 15 and operates the control valve 19 to the position illustrated in Figure 2 so that oil, or other liquid, is forced by the pump 16 from the reservoir 18 into a cylinder 28 in the lower portion of the hydraulic motor 8.

The pressure of this oil forces a piston, generally indicated at 30, upwardly. The direct or rectilinear movement of the piston 30 is converted to rotary movement by means of a pair of rollers 32 carried by the piston 30 and which engage a cam surface 34 on an enlarged lower portion of a hinge drive member 35 arranged to engage and lock with the hinge 6 so that the hinge drive member and the door 2 rotate in unison. The upward movement of these rollers 32 acting on the cam surface 34 produces a resulting couple that causes the hinge drive member 35 to rotate in the direction in which it was initially moved by the person wishing to pass through the doorway.

When the door 2 is closed, the rollers 32 are "dead centered" on the cam surface 34 and no rotary force can be produced by the hydraulic motor so long as the rollers are in this position. The upward force of these rollers, however, will produce a rotary force or torque in the direction of initial rotary displacement of the cam surface 34. Thus, the single hydraulically powered mechanism is utilized to open and close the door in either direction under the manual control of the person wishing to pass through the doorway.

Once the initial movement has been imparted to the door, the power-operated hydraulic mechanism opens the door fully and holds it open during a predetermined time interval, when the central control unit 23 operates the control valve 19 to release the pressure on the piston 30, permitting springs 36, which were compressed by the piston 30 as the door opened, to move the piston downwardly to its initial position, causing the door to close. The closing torque is produced by the force of the rollers 32 against a lower cam surface 37 carried by the hinge drive member 35 and which has a shape substantially complementary to the upper cam surface 34.

The control valve 19 is provided with an outer casing or valve body 38 and an internal control plug 40 arranged for sliding movement within the valve body 38, the movement of the control plug 40 being controlled by a solenoid, generally indicated at 42. The control plug 40 which is moveable between an "actuating" and a "release" position by means of this solenoid 42, is shown in Figure 2 in its "actuating" postion with the solenoid 42 energized. That is, it is assumed that the door handle 14 has been moved, actuating the switch 24 and displacing the door slightly inwardly from its normally closed position so that oil is being supplied under pressure to the cylinder 28 in the hydraulic motor 8.

The oil from the reservoir 18 passes through an oil line 44 into the pump 16 from which it travels through a line 46 into an annular inlet groove 48 within the control valve 19. From this groove, the oil passes along a distribution chamber 50 formed by a recessed portion of the control plug 40 and extending longitudinally within the valve 19 between the inner surface of the valve body 38 and the outer surface of the control plug 40.

The oil passes from the chamber 50 into an annular supply groove 52 on the internal surface of the valve body 38, and thence into the supply line 20 by which it is conducted into the power cylinder chamber 28 of the hydraulic motor 8. This oil forces the piston 30 upwardly, opening the door to its full extent.

During the upward movement of the piston 30, the oil in an upper cylinder chamber 54 above the piston passes through the return line 22 into an annular return groove 56 in the valve body 38. The oil passes around this groove and returns through a line 58 to the reservoir 18.

During this opening movement, a valve mechanism, to be described later, which is controlled by the movement of the piston 30, by-passes a portion of the oil from the lower cylinder chamber 28 into the upper cylinder chamber 54 so that the speed with which the door opens is reduced gradually as it reaches its open position.

So long as the oil pressure is maintained in the cylinder 28, the door will remain open. The central control unit 23 includes a time-delay circuit which functions to cause the door to close after a desired interval of time.

In order to close the door, the central control unit 23 de-energizes the solenoid 42, allowing a compression spring 60, positioned between the end of the internal control plug 40 and the end of the valve body 38, to return the control plug 40 to its "release" position as shown in Figure 3.

At this time, the motor 15 is de-energized, stopping the pump 16. It is not necessary, however, to stop and start the motor each time the door is opened, and another mode of operation will be described presently in which the motor 15 and the pump 16 operate continuously.

With the control plug 40 in its "release" position, the door-closing springs 36 move the piston 30 downwardly, forcing the oil in the cylinder 28 back through the oil supply line 20 into the annular supply groove 52 from which it flows along an annular return recess 62 in the surface of the control plug 40 into the annular return groove 56 in the valve body 38 from which it flows through the oil return line 22 to the upper chamber 54 to fill this chamber as the piston 30 moves downwardly. From the annular return groove 56 any excess oil may also flow into the reservoir 18 through the reservoir line 58.

With the valve control plug 40 in its "release" position, an oil path is also completed through the control valve 19 from the pump 16 back to the reservoir 18, by-passing the hydraulic motor 8. Thus, oil entering the annular inlet groove 48 from the pump 16, passes along the annular distribution chamber 50 (Figure 3) to an annular re-circulating groove 66 from which it returns through the line 58 to the reservoir 18.

With this arrangement, pressure is removed instantly from the hydraulic motor 8 when the control valve 19 is returned to its "release" position, irrespective of the operation of the pump 16.

The central control unit 23, illustrated schematically in Figure 2, controls the operation of the pump 16 and of the control valve 19. The mode of operation of the door-operating system is manually controlled by a three-position rotary switch, generally indicated at 68. When this rotary switch is in its central or "off" position, no power is applied to the door by the hydraulic motor 8 and the door 2 can be used as a conventional door, the springs 36 in the motor 8 serving as a door-closer to return the door to its closed position.

When the switch 68 is in its left-hand or automatic "cycling" position, the circuit is conditioned for the sequence of operations described above such that the motor 15 and the pump 16 operate only during the time the door 2 is opening or being held open. This mode of operation is desirable when the door is opened infrequently. However, with more frequent operation of the door, this mode of operation is undesirable, because the frequent starting of the electric pump motor 15 may cause it to overheat unless special cooling facilities are provided. Under the latter conditions of use, the motor 15 and pump 16 are operated continuously by placing the switch 68 in its right-hand or "continuous" position.

Assuming that the rotary switch 68 is in its "cycling" position, as shown in Figure 2, the operation of the central control unit 23 is as follows: A person desiring to enter through the doorway, gently pushes against the outside door handle 14 closing the contacts 69 and 70 of the door switch 24 and displacing the door slightly from its closed position. The closing of the contacts 69 and 70 completes a circuit between a cathode 71 and a control grid 72 of a vacuum tube 73.

This circuit can be traced from the contact 69 through a switch lead 74, a commutator brush 75, whose function will be described later, a commutator segment 76, and a cathode lead 77 to the cathode 71 of the tube 73. The control grid 72 of this tube is connected through a lead 78, a slip ring 79, a brush 80, and a switch lead 82 to the central contact 70 of the door switch 24.

Thus, the switch 24 closes a direct circuit between the control electrodes 71 and 72 of the tube 73. The effect of this circuit will be made clear presently.

The anode 86 of the vacuum tube 73 is connected through an actuating winding 87 of a control relay, generally indicated at 88, to a positive output terminal 90 of a conventional rectifier-filter power supply, generally indicated at 92.

The power supply 92 includes a transformer 94 having a primary winding 96 one end of which is connected through a lead 98 to an alternating current supply main 100. The other end of primary winding 96 is connected to the other supply main 102 through a lead 104 and a "cycle" contact 106 and arm 108 of the rotary switch 68.

A low-voltage secondary winding 109 of the transformer 94 is connected to the heater 110 of the vacuum tube in conventional manner, the connecting leads being omitted from the showing in order to simplify the drawing.

One end of a high-voltage secondary winding 112 of the transformer 94 is connected to the common ground circuit, and its other end is connected through a dry rectifier 114 to the positive voltage supply terminal 90. A filter condenser 116 is connected between the positive terminal 90 and the common ground circuit.

The vacuum tube 73 ordinarily is biased to "cut off" so that no appreciable plate current flows through the winding 87 of the relay 88. This bias voltage is provided by a voltage divider circuit comprising two fixed resistors 118 and 120 connected between the positive power supply terminal 90 and the common ground circuit. The cathode 71 is connected to the junction of these two resistors so that the cathode is biased positively with respect to the common ground circuit. The control grid 72 is connected to the ground circuit through a variable resistor 122 and, so long as no current is flowing in the grid circuit, the control grid 72 is at ground potential and, therefore, is negative with respect to the cathode 71.

When the contacts 69 and 70 of the door switch 24 are closed, as described above, the grid 72 and the cathode 71 are connected directly together and thus assume the same potential, removing the bias from the tube 73 which accordingly draws plate current energizing the actuating winding 87 of the relay 88 and completing a circuit between its armature 124 and a contact point 126.

The energization of relay 88 completes a circuit which may be traced from the power main 100 through an actuating winding 128 of a main power relay, generally indicated at 130, contact 126 and arm 124 of the control relay 88, a lead 131, and contact 106 and arm 108 of the control switch 68 to the other power main 102.

The power circuit for the pump motor 15 is completed by the energization of the winding 128 of the relay 130 and may be traced from power main 102 through the arm 108 and the contact 106 of the switch 68, contact points 132 and 134 of the relay 130 and a lead 136 to one terminal of the motor 15. The other terminal of this motor is connected by a lead 138 directly to the power main 100.

The valve-operating solenoid 42 is also energized at this time, pushing the control plug 40 of the control valve 19 toward the right, as shown in Figure 2.

The energizing circuit for the solenoid 42 may be traced from the power main 102 through the arm 108 and the contact 106 of the switch 68, contact points 140 and 142 of the main power relay 130, and a lead 144 to one terminal of the winding of the solenoid 42. The other terminal of this winding is connected through the lead 138 directly to the power main 100. As explained above, the operation of the pump 16 and control valve 19 causes the hydraulic motor 8 to open the door inwardly, that is, in the direction of its initial displacement.

In order to prevent the door from closing immediately upon the release of the door handle 14, a time delay circuit is provided to maintain the energization of the motor 15 and the solenoid 42 for a short interval of time after the contacts 69 and 70 of the door switch 24 are opened.

The extent of this period of delay is manually adjustable from zero time up to a maximum of several seconds by means of the variable resistor 122. When the resistor is adjusted for zero resistance, there is no time-delay period and when adjusted for maximum value, the door is held open for the maximum period before it begins to close.

Assuming that the resistor 122 is adjusted for maximum delay, then the instant that a person gently pushes against the handle 14, the above sequence of operations takes place and applies a torque to the door hinge, opening the door. As the door swings open, it tends to move away from the person, releasing the pressure on the handle 14 and allowing the door switch 24 to open, opening the circuit between the control grid 72 and the cathode 71.

However, the tube 73 is not biased immediately to "cut off" because of a large condenser 146, for example having a capacity of twelve microfarads, connected between these control electrodes. Accordingly, it is necessary to build up a charge on the condenser 146 before the plate current of the tube 73 will be cut off. This charging current must pass through the variable resistor 122, so that the time required for the charge to build up is a function of the setting of the movable contact of the resistor 122.

As the charge on the capacitor 146 gradually builds up, the control grid 72 assumes a negative potential, relative to the cathode 71, equal to the voltage across the cathode resistor 120, and the plate current through the tube 73 ceases, de-energizing the relay 88. Thus, the main power relay 130 is de-energized, and the power circuit to the pump motor 15 and to the solenoid 42 is opened. This instantly removes the oil pressure from the hydraulic motor 8, as explained above, and allows the springs 36 in the hydraulic motor 8 to gradually return the door 2 to its closed position.

By manually adjusting the resistor 122 to a smaller value, the rate at which the capacitor 146 is charged up to the cut-off value increases, and correspondingly the period during which the door is held open is decreased.

If the resistor 122 is adjusted to its minimum value, the period of time for the capacitor 146 to reach cut-off voltage is reduced substantially to zero, consequently the door 2 will begin to close as soon as the person passing through the doorway removes the pressure from the handle 14. In other words, with the control unit 23 adjusted for zero time delay, the door 2 will begin to open, driven by the hydraulic motor 8, as soon as a person gently presses on the handle 14. As the person continues through the doorway, still pressing gently on the handle 14, the door 2 is driven further open, and as soon as the pressure is removed from the handle 14 the door gradually closes. If the person passing through the doorway desires to hold the door in an open position, he merely maintains a slight pressure on the door handle, and the hydraulic system holds the door in that position so long as the handle is so held.

If the rotary switch 68 is in its "continuous" position, the operation of the control unit 23 is the same as before except that the operation of the motor 15 is no longer under the control of the main relay 130 which now controls only the solenoid 42 in the manner set forth above.

The circuit for energizing continuously the motor 15 can be traced from the power main 102 through the arm 108 and a contact 148 of the switch 68, and the lead 136 to one terminal of the motor 15, the other terminal of which is connected as before to the main 100.

Thus, the motor 15 and pump 16 run continuously, irrespective of the position of the relay 130, merely recirculating the oil in the hydraulic system until such time as the control valve 19 is operated by closure of the door switch 24, when the oil is fed through supply line 20 to the hydraulic torque motor 8.

*Door displacement-sensing means*

In order that the door 2 will remain at all times under manual control, even though the door is ordinarily operated automatically throughout its cycle, a displacement-sensing arrangement, generally indicated at 150, is provided. Assume that the outside door handle 14 has been pressed, closing the contacts 69 and 70, and that the door 2 has only partially opened. If at this time the inside door handle 13 is pressed, either purposely or by the door striking an object, or that the outside door handle 14 is pulled in a direction away from the door, the central contact 70 engages a contact 152 in the door switch 24, short-circuiting the variable resistor 122. When the resistor 122 is short-circuited, the condenser 146 is charged substantially instantaneously, the cathode resistor 120 being relatively low in value, and the plate current in tube 73 ceases immediately causing the de-energization of the relays 88 and 130 and de-energizing the valve control solenoid 42 to release the oil pressure to the motor 8 and cause the door to start immediately to close.

The circuit by which the resistor 122 is short-circuited can be traced from the control grid 72, which is connected to the movable contact on the resistor 122, through the lead 78, the slip ring 79, the brush 80, switch lead 82, the door switch contacts 70 and 152, a brush 154, a commutator segment 156, and to the opposite end of the resistor 122 through the common ground circuit.

When the door is displaced in the opposite direction, that is, outwardly, it is necessary to reverse the functions of the door switch contacts so that the contact 152 becomes the door-operating contact and the safety function is provided by the contact 69. This reversal is accomplished by the displacement-sensing means 150 including the commutator segments 76 and 156.

Figure 9:
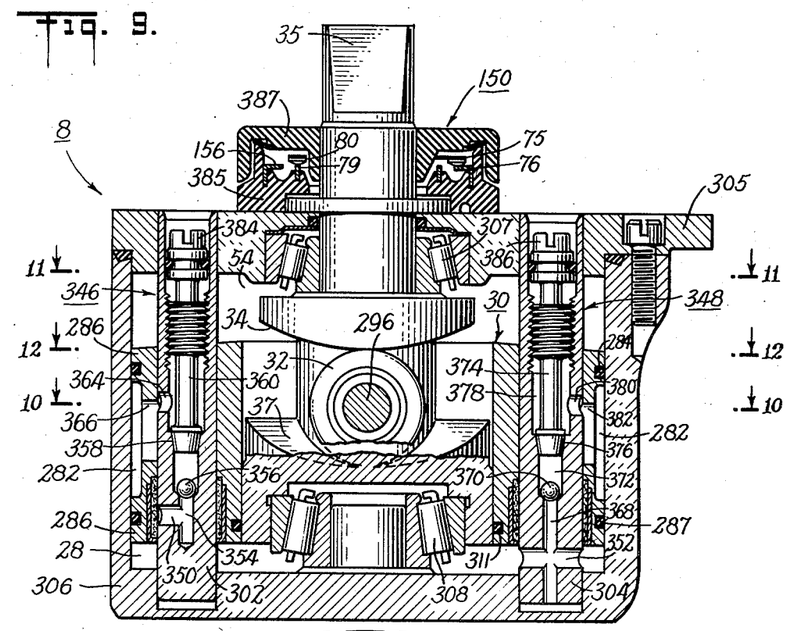
Figure 9 is an enlarged vertical sectional view of the hydraulic motor of Figure 5.
Figure 10:
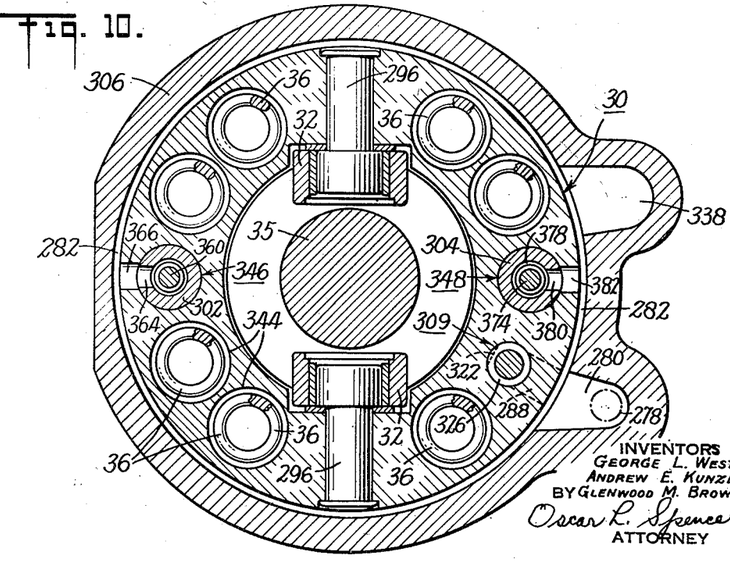
Figure 10 is a sectional view taken along line 10—10 of Figure 9 showing the arrangement of two drive rollers carried by a hydraulically driven piston.
Figure 11:
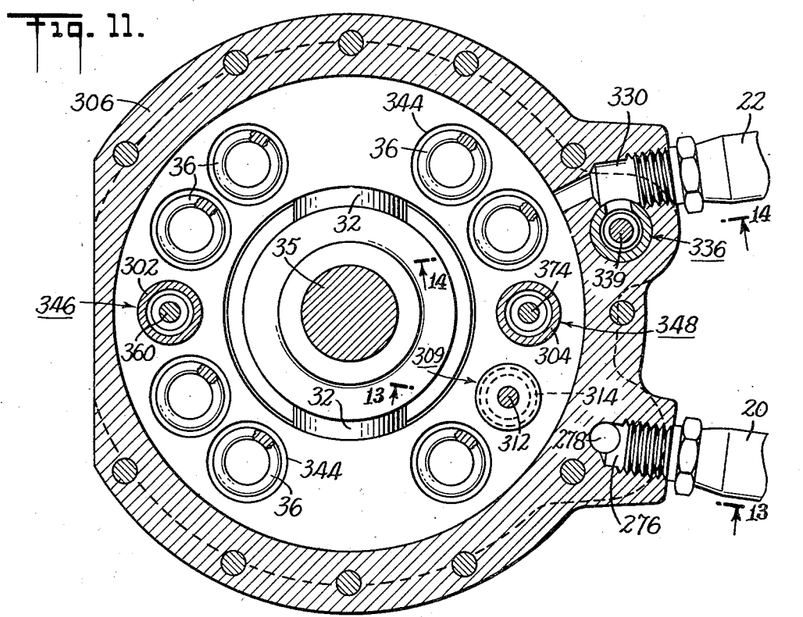
Figure 11 is a sectional view taken along line 11—11 of Figure 9 showing the location of door-closing springs and the oil inlet and return ports.
Figure 12:
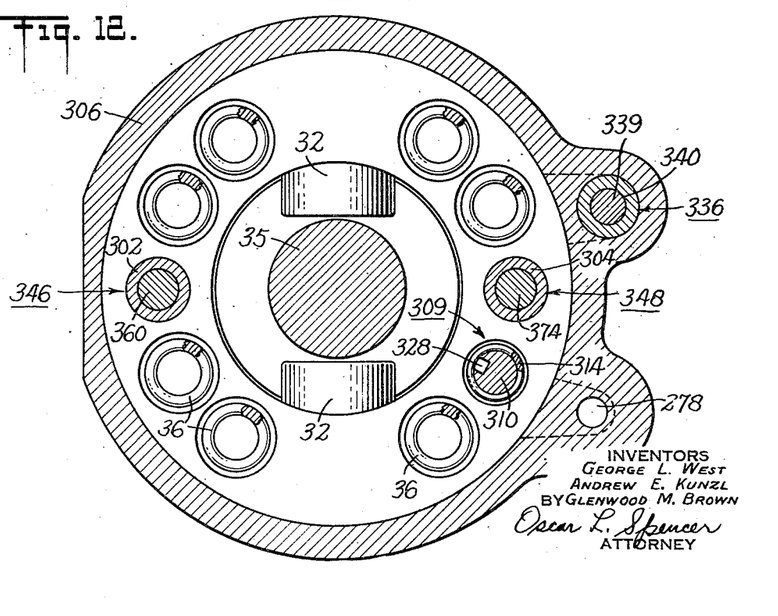
Figure 12 is a sectional view taken along line 12—12 of Figure 9 showing the location of the cam-follower rollers.

The brushes 75 and 154 are arranged to rotate with the hinge drive member 35 in synchronism with the door. The segments 76 and 156 and the slip ring 79 are supported by any suitable arrangement of insulating material and may be positioned conveniently just above the hydraulic motor 8, although any other desired arrangement may be used. The two commutator segments 76 and 156 are substantially semicircular in shape as shown in Figure 2 and the adjacent ends of the segments are spaced from each other. These segments may be embedded in suitable insulating material but with their upper surfaces exposed for contact with the brushes 75 and 154. Suitable construction is shown in Figure 9. It is possible, of course, to move the commutator segments and slip ring with the door 2 while maintaining the brushes in fixed positions, but rotation of the brushes is usually more desirable. It will be apparent also that a switch mechanism equivalent to the commutator arrangement may be used. Thus, a reversing switch operated by displacement of the door may be used, the connections to the door switch being made by flexible leads or springs or by a slip ring arrangement.

When the door is displaced outwardly, the rotation of the brushes in a counterclockwise direction, as viewed in Figure 2, causes the brush 75 to make contact with the segment 156 and the brush 154 to make contact with the segment 76. The circuit is now arranged so that the closing of the door switch contacts 70 and 152 short circuits the condenser 146 causing the door to open outwardly. The closing of the contacts 69 and 70 now short circuits the resistor 122, instantly re-charging the condenser 146 and interrupting the operation of the door.

The brushes 75 and 154 are not quite 180° apart so that both are in contact with the commutator segment 76 when the door is in its closed position. Thus, closure of the door switch 24 immediately initiates the power drive mechanism, and bulids up the oil pressure in the motor cylinder 8, so that as soon as the door is displaced from its closed or "dead center" position a strong torque is developed to open the door.

As an alternative arrangement, the brushes 75 and 154 may be positioned within the spaces between the adjacent ends of the commutator segments 76 and 156 when the door 2 is fully closed. With this arrangement, the door switch is ineffective to initiate the power drive mechanism until the door is displaced slightly in one direction or the other.

*The hydraulic power unit (Figures 4, 6, 7, and 8)*

Figure 6:
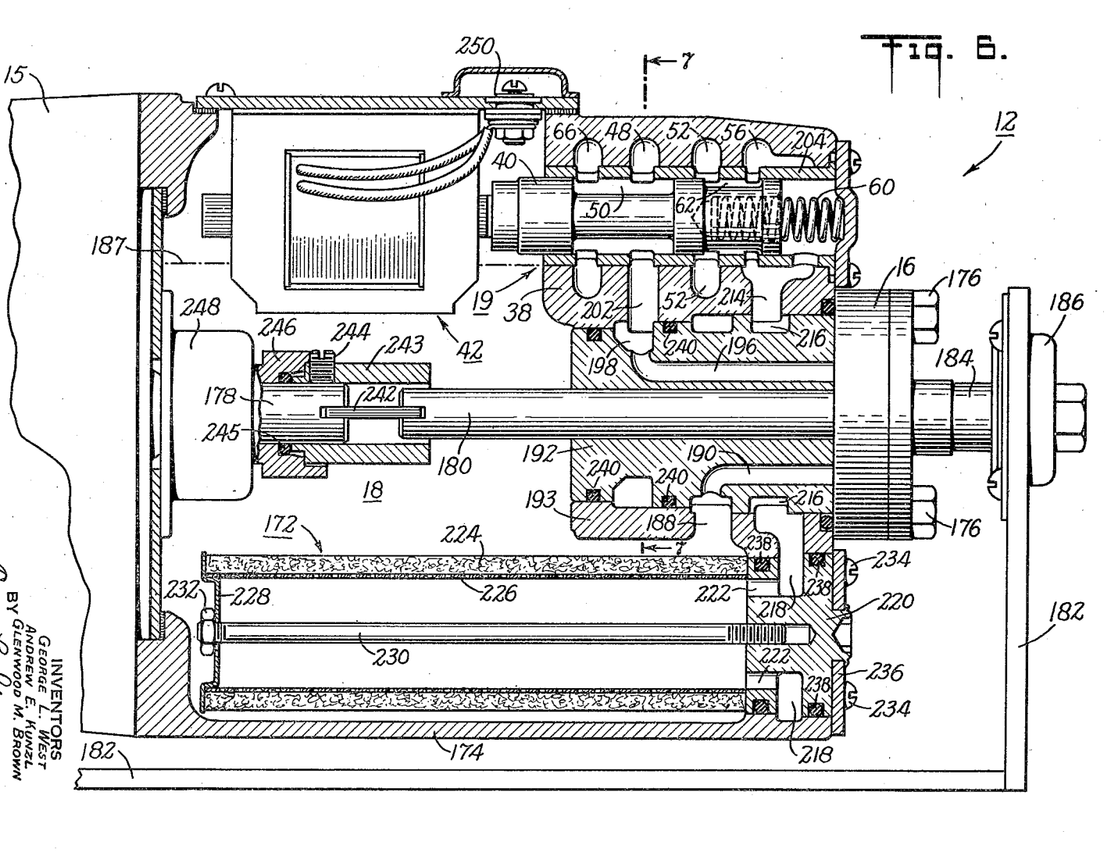
Figure 6 is an enlarged longitudinal sectional view of the hydraulic power unit of Figure 4.

Figure 6 illustrates the construction of the hydraulic power unit 12 and the oil distribution system shown diagrammatically in Figures 1 to 3.

The control valve 19, the solenoid 42, and an oil filter, generally indicated at 172 (Figure 4), are encased within a housing 174 which serves also as the reservoir 18 for the oil supply. The oil pump 16 is secured by stud bolts 176 (see also Figure 6) directly to one end of the housing 174.

The electric motor 15 which drives the pump 16 is secured to the opposite end of the housing 174 with its drive shaft 178 extending into the oil reservoir 18 where it is keyed to a drive shaft 180 that extends on through the housing 174 and drives the pump 16.

The housing 174 and the motor 15 are supported within a suitable cradle 182 (see also Figure 1). A shaft 184 extends from the outside end of the pump 16 into a resilient support 186 mounted on the cradle 182.

Figure 4:
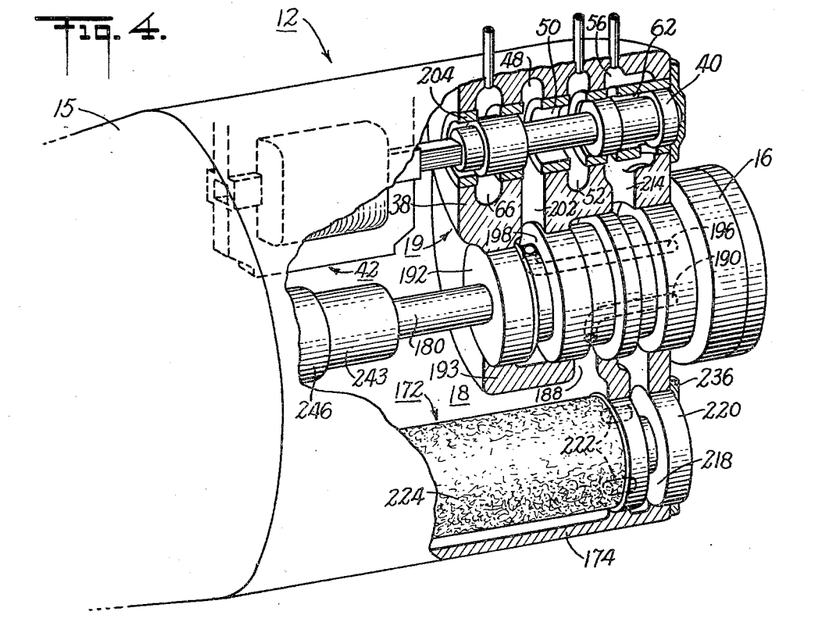
Figure 4 is a perspective view of a hydraulic power unit with portions of the outside housing and an internal valve block cut away to show the construction.

In Figure 6, the solenoid 42 is shown in deenergized position so that the valve 19 does not direct any oil into the hydraulic motor 8. If the pump 16 is operating with the valve in this position, the oil, which is maintained in the reservoir 18 to the level indicated at 187, passes through an intake opening 188 and into the pump 16 through a bore 190 in a cylindrical oil distribution block 192 mounted within a housing 193 which may be formed integrally with the valve body 38 and the housing 174, as best shown in Figure 4. The oil leaves the pump 16 (Figure 6) through a bore 196 in this same distribution block 192 and enters an annular channel 198 which opens into a passageway 202 that communicates with the annular valve inlet groove 48 of the valve 19. The oil then passes along the annular distribution chamber 50, formed by longitudinal recesses on the surface of the valve control plug 40, into the annular re-circulating groove 66.

Figure 7:
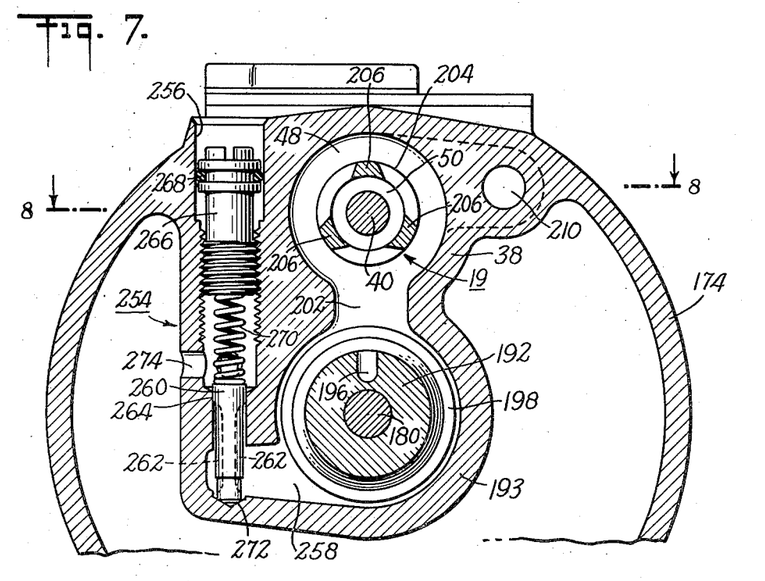
Figure 7 is a partial sectional view taken along line 7—7 of Figure 6 showing the arrangement of a safety pressure release valve.
Figure 8:
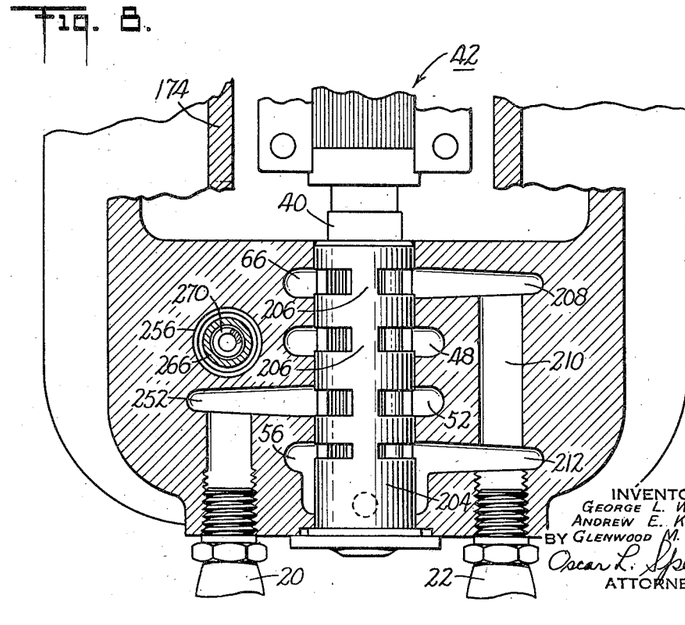
Figure 8 is a partial sectional view taken along line 8—8 of Figure 7 showing the connections between the hydraulic control valve and the oil supply and return lines which communicate with the hydraulic motor of Figure 5.

As is best shown in Figure 7, the valve body 38 is provided with an insert sleeve bearing 204 having three longitudinal guide members 206 forming a smooth bearing surface within which the valve plug 40 slides, preventing any possibility of mis-alignment of the plug. The plug 40 is arranged to fit precisely within this sleeve bearing 204 (Figure 6) in order to prevent excessive leakage at the valve.

From the annular re-circulating groove 66, the oil passes through passageways 208, 210 and 212 (Figure 8) into the annular return groove 56, thence through a passageway 214 (Figure 6), through an annular groove 216 in the distribution block 192, and into an annular opening 218 in a filter head 220 from which it passes through bores 222 into the internal chamber of the filter 172.

The oil passes through the external cylindrical walls 224 of the filter into the reservoir 18. The walls of the filter 172 may be formed of any suitable filtering material, such as felt or the like, supported on a cylindrical metal screen 226 that is clamped between an end plate 228 and the filter head 220 by means of a tie-rod 230 which is in threaded engagement with the filter head 220 and extends longitudinally through the center of the filter 172 and through the end plate 228 to which it is secured by means of a nut 232.

Any other filtering arrangement, either within the oil reservoir 18 or separate therefrom, may be employed if desired. However, the arrangement shown is particularly desirable in that it requires but a small amount of space and may be readily removed for cleaning or replacement. In order to remove the filter, it is only necessary to remove the screws 234 and a retaining ring 236, permitting the entire filter assembly to be withdrawn, longitudinally. O-rings as indicated at 238 are positioned within peripheral grooves around the filter head 220 to prevent oil leakage.

Thus, with the control valve 40 in the position indicated in Figure 6, the oil is merely circulated from the reservoir through the pump and valve assembly and back through the filter into the reservoir.

Oil leakage along the interface between the distribution block 192 and the housing portion 193 of the valve body 38 is prevented by means of O-rings indicated at 240.

The distribution block 192 serves as a relatively long bearing support for the pump shaft 180 and permits the pump shaft to be joined to the motor shaft 178 by a key 242 engaging slots in the ends of the two shafts. Thus, the pump 16 may be removed from the housing 174 merely by removing the cradle 182 and the stud bolts 176 and sliding out the entire pump assembly including the shaft 180. A sleeve 243 surrounds the key 242 and is secured to the shaft 178 by a set screw 244 to rotate therewith.

Suitable provisions are made to prevent oil leakage at the end of the housing adjacent the electric motor 14. Thus, suitable packing 245 is provided around the motor shaft 178 to prevent oil leakage along the interface of the shaft and the inner wall of a bearing sleeve 246. A suitable oil sealing arrangement is also provided within a cover 248 which surrounds a portion of the sleeve 246.

The solenoid 42 is of conventional construction and is supported from the top of the housing 174, electric connections to the solenoid winding being made through a terminal board 250 positioned in the upper surface of the housing 174.

When the valve control plug 40 of the control valve 19 is in its "actuating" position, as shown in Figure 4, the oil from the pump 16 which passes through bore 196 (see also Figure 6) and opening 202 into the annular inlet groove 48, passes along the distribution channel 50 into the annular supply groove 52 and thence through a passageway 252 (Figure 8) into the supply line 20 which delivers it to the cylinder 28 of the hydraulic motor 8. The oil returning from the hydraulic motor 8 through the return line 22 (Figure 8) passes through the passageway 212, the return groove 56, the passageway 214 (Figure 6), the annular groove 216, the annular opening 218 in the filter head 220, and through the bores 222 into the filter 172.

In order to provide a safety or overload release so that no damage will be done if the movement of the door is interfered with, as by the door striking a person or some object as it is opening, a safety valve, generally indicated at 254 in Figure 7, is provided to permit the oil to by-pass the hydraulic motor 8 whenever the oil pressure exceeds a predetermined limit.

This valve is positioned in an opening 256 extending downwardly from the housing 174 through the valve body 38 and opening through a passageway 258 into the annular channel 198 which is connected by the bore 196 with the outlet of the pump 16.

Positioned within the opening 256 is a slidable valve member 260 having two longitudinal grooves 262 extending along its central portion. This valve member 260 extends into the passageway 258 and forms a sliding fit with the walls of the valve body 38 as indicated at 264. The upper portion of the opening 256 is provided with internal threads which engage a threaded adjustment plug 266 provided with a suitable oil seal arrangement as is indicated at 268 to prevent oil leakage along the plug 266.

A compression spring 270 is positioned between the lower end of the plug 266 and the upper end of the valve member 260. This spring normally forces the valve member 260 into contact with a seat 272 formed on the opposite wall of the passageway 258. The valve opening 256 below the plug 266 is connected by a port 274 directly into the reservoir 18.

With this arrangement, when the oil pressure in the bore 196 and groove 198 from the pump 16 becomes greater than a pre-set limit, indicating a jamming action or that something is impeding the free movement of the door 2, the oil pressure within the oil passageway 258 forces the valve member 260 upwardly permitting the oil to flow from passageway 258 along the grooves 262 and through the port 274 into the reservoir 18.

The pressure at which the safety valve opens can be adjusted by screwing the plug 266 along the threaded wall of the opening 256 thus changing the biasing force of the spring 270.

*The hydraulic motor (Figures 5 and 9 to 15)*

Figure 5:
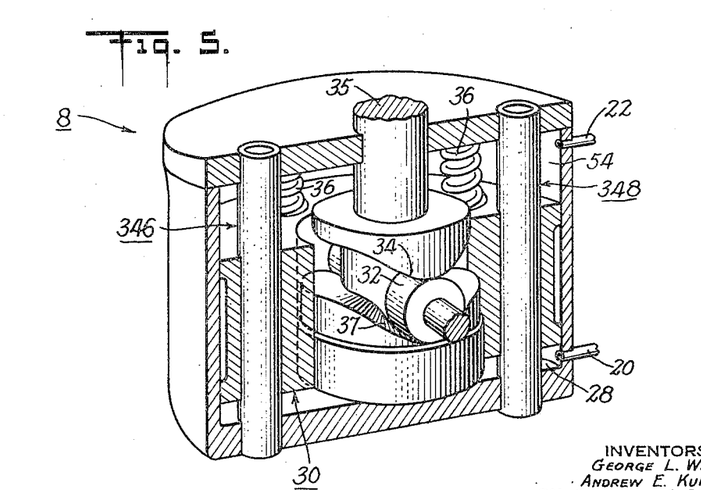
Figure 5 is a simplified perspective view of a hydraulically operated motor, a portion of the motor being cut away to show the internal construction.

The hydraulic motor is illustrated in a simplified perspective view in Figure 5, and the operation will be understood more easily by occasional reference to this figure. Oil under pressure flows to the motor 8 through the oil supply line 20 (Figure 13) and into an inlet port 276 and vertical bore 278. From the bore 278 the oil under pressure flows through a passageway 280 into an annular groove 282 extending around the periphery of the piston 30 (see also Figures 9 and 10).

The oil in the piston groove 282 is prevented from leaking past flanges 286 at the top and bottom of the groove 282 by oil seals 287 positioned in peripheral grooves in the piston 30.

Oil from the piston groove 282 passes through an opening 288 into a limit valve cavity 290 and thence downwardly past a flap-type check valve 292 into the chamber 28 wherein the oil exerts pressure on the bottom of the piston 30 to move it upwardly.

The piston 30 carries the rollers 32 (Figure 10) rotatably mounted on a pair of internally-extending stub shafts 296. These rollers 32 make contact with the cam surface 34 to provide the door-opening torque. The cam surface 34 is formed on the underside of a shoulder of an enlarged portion of the hinge drive member 35 and comprises two convex surface portions joined to form a smooth continuous annular cam surface having two diametrically opposed high points and two intervening diametrically opposed low points. Because the piston 30 is prevented from rotating within the housing 306 by a pair of hollow guide sleeves 302 and 304 (Figure 9) which are secured into the base and cover plate 305 of the housing 306 of the motor 8, the rollers react against the cam surface 34 to impart a torque to the integral hinge drive member 35.

When the door 2 is in its fully closed position the rollers 32 are in their lowest or "dead center" neutral position as shown in Figure 9. As a person gently pushes upon either of the handles 13 or 14, the door is given a slight initial displacement rotating the hinge drive member 35 in the direction in which he desires the door to move. This initial movement of the drive member 35 removes the cam surface 34 from its "dead center" position with respect to the rollers 32. The increasing oil pressure in chamber 28 now begins to move the piston 30 upwardly and the rollers 32 cause the continued rotation of the cam surface 34 so as to swing the door 2 to its fully opened position.

The integral drive member 35 is provided with suitable top and bottom thrust roller bearings 307 and 308, respectively, which prevent vertical movement of the drive member 35 and permit the door 2 to swing smoothly and freely. Oil seals, as at 311, are provided between the inner surface of the piston 30 and the outer surface of the drive member 35.

In order to control the extent of the door's opening and to regulate the rate at which it slows down and comes to a stop at its fully opened position, a door swing control valve, generally indicated at 309 (Figure 13), is positioned slidably within the passageway 290. The swing control valve 309 is used to set the full open position of the door at any desired point and in this embodiment permits adjustment between positions 30° and 90° from the closed position. The valve 309 also acts to bring the door 2 to a gradual stop as it approaches this predetermined full-open position.

Figures 13, 14, 15:
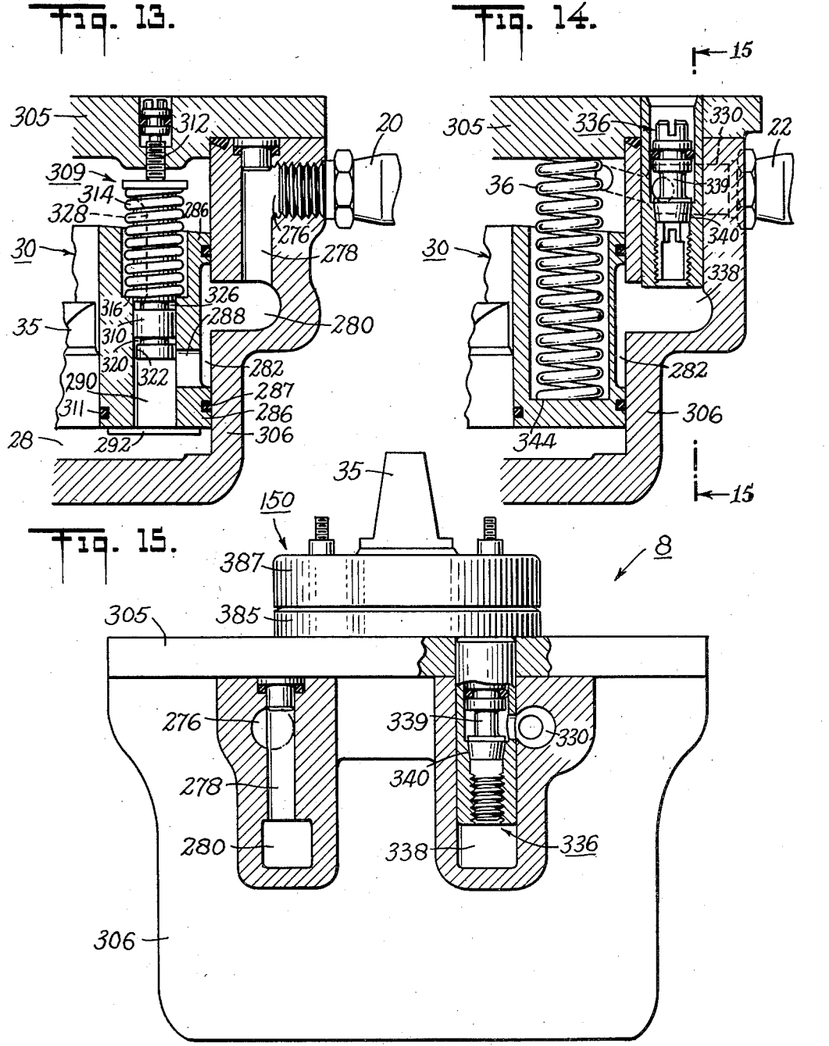
Figure 13 is a partial sectional view taken along line 13—13 of Figure 11 showing a valve for slowing the rate of opening of the door as it nears its fully open position.
Figure 14 is a partial sectional view taken along line 14—14 of Figure 11 showing a by-pass valve for regulating the over-all opening speed of the door.
Figure 15 is a sectional view taken along line 15—15 of Figure 14 showing the connection between the by-pass speed-control valve and the outlet port and the relative position of the inlet passageway.

The valve 309 includes a valve stem 310 arranged to slide in the passageway 290. The upper end of the valve stem 310 is held against an adjusting screw 312 by a compression spring 314 positioned on a shoulder 316 in the upper portion of the piston 30. As the piston 30 moves upwardly the valve stem 310 is held in a fixed position with respect to the cover 305 of the housing 306, since it bears against the screw 312, and the lower end of valve stem 310 closes off the passageway 288, slowing the rate at which oil is admitted to the power cylinder 28. This restriction in the flow of oil causes the door 2 to slow down as it approaches its full-open position.

It will be noted that the valve stem 310 is provided with an annular groove 320 extending therearound, and a small flat face 322 is provided on the side of the valve stem 310 between the annular groove 320 and the bottom end of the stem. Oil thus is permitted to flow slowly from the passageway 288 around the annular groove 320, downwardly along the flat portion 322 and into the main power chamber 28 to continue the gradual movement of the door 2 toward its full-open position.

When the piston 30 has moved upwardly to a position such that oil can pass from the passageway 288 into an annular groove or chamber 326 provided by a reduced section on the valve stem 310, the oil has access to the upper oil chamber 54 through an elongated recess 328 in the valve stem. The piston 30 ceases its upward travel at a position wherein the pressure in main power cylinder 28 is maintained at a value equal the compression force of the door-closing springs 36 and to provide the torque on hinge drive member 10 necessary to hold the door open.

When this equilibrium or full-open position is reached, a part of the supply pressure oil bleeds continuously through the elongated recess 328 into the upper chamber 54 and thence out the exit port 330 (see also Figures 11 and 14) to the oil return line 22. Thus, it is seen that the action of the door swing control valve 309 is to cause the door to slow down and gradually approach its full-open position. This full-open position can be adjusted to any desired value less than 90° simply by screwing the adjusting screw 312 downwardly.

It should be noted that the construction of the door swing control valve 309 and the piston 30 are such that the final portion of the piston travel during which the piston continues upwardly opening the door 2 at the reduced rate is a fixed distance irrespective of the setting of the valve 309 for the full open position of the door 2.

In order to provide easy and flexible adjustment of the speed with which the door 2 commences to open and with which it travels through the larger part of its opening swing, a speed of opening control valve, generally indicated at 336 in Figures 14 and 15, is provided to by-pass an adjustable amount of oil from the annular piston groove 282 (Figure 14), through a passageway 338 directly into the return port 330.

The speed of opening control valve 336 includes a valve stem 339 bearing against a valve seat 340. The amount of oil that is by-passed can be controlled adjusting the setting of the valve stem 339. As the valve 336 is adjusted to permit less oil to be by-passed at a given pressure, greater opening speed is attained. When the valve 336 is adjusted to pass a relatively larger quantity of oil, the door opens more slowly.

When the control valve 19 is returned to its "release" position, the flow of supply pressure oil is instantly removed from the hydraulic motor as explained above. The piston 30 is then forced downwardly by the seven compression springs 36 (Figures 5, 12 and 14) which are positioned between recesses 344 (Figure 14) in the piston 30 and the housing cover plate 305. As the piston 30 moves downwardly, the rollers 32 bear downwardly against the cam surface 37, similar in shape to the cam 34, and produce a couple or torque restoring the door 2 to its closed position.

As the piston 30 begins its downward movement, the oil in the lower chamber 28 has two alternative routes by which it can reach the supply line 20 and return into the upper chamber 54 or into the reservoir 18 as described above. These alternative routes are provided by a pair of closing speed control valves, generally indicated at 346 and 348 in Figure 9. These valves serve to meter the rate with which the oil escapes from the lower cylinder 28, and thus determine the rate at which the door 2 swings toward its closed position.

In Figure 9, the valve 346 has access to the lower chamber 28 through a passageway 350 extending radially in the guide sleeve 302. Similarly, the valve 348 has access to the lower chamber 28 through a passageway 352 in guide sleeve 304, which is lower than the corresponding passageway 350 in the guide sleeve 302. Thus, it can be seen that during the initial period of downward movement, oil can flow through both of these valves 346 and 348, allowing the door to begin closing fairly rapidly. However, when the piston 30 has progressed downwardly far enough that the pasasgeway 350 is obtruded, then oil can flow only through the passageway 352 and the valve 348, reducing the rate of closing as the door approaches its fully closed position.

The path of the oil from chamber 28 through the initial rate of closing valve 346 can be traced through passageway 350, thence upwardly through a passageway 354 past a ball check valve 356, and through the opening between a valve seat 358 and a valve stem 360 of the initial closing valve 346. The downward force of the springs 36 causes pressure to build up in the passageway 354, lifting the ball of the check valve 356 and permitting the oil to flow out through a passageway 364 in the guide sleeve 304 and thence through a horizontal passageway 366 in the piston 30 into the annular piston groove 282. From this groove 282, the oil can then return, as shown in Figure 13, through the passageways 280 and 278 and the supply port 276, respectively, into the supply line 20.

During the last part of the closing movement, the oil passes from cylinder 28 through the passageway 352 in guide sleeve 304 (Figure 9), then upwardly through a passageway 368 past a ball check valve 370 into the passageway 372. The oil in passageway 372 passes between the valve stem 374 and a valve seat 376 into an annular passageway 378 between the valve stem 374 and the inside of the hollow guide sleeve 304, through a drill hole 380 in the guide sleeve 304, and thence through a passageway 382 in piston 30 to the annular groove 282.

The openings of the valves 346 and 348 may be adjusted by turning their respective screw heads 384 and 386, accessible through the open ends of the guide sleeves 302 and 304. These adjustments serve to predetermine the initial and final rates of closure so that the door will approach its closed position at a first relatively rapid rate and then more slowly so that it closes without appreciable "overtravel" or oscillation about the closed position.

Although the hydraulic torque motor 8 has been shown with a total of seven compression springs 36 arranged in a circle in suitable recesses 344 (Figure 10), any desired number of springs of sufficient stiffness can be used. The total required closing force depends to some extent upon the size and mass of the door 2, the wind loads which may be expected upon the door in its installation, and other such considerations.

Mounted on the cover plate 305 is an insulation block 385 shaped with an upstanding lip to form a weather seal and arranged to hold the commutator segments 76 and 156 and the slip ring 79. Secured to the hinge drive member 35 is a rotatable insulating member carrying the brushes 75, 80, and 154 (not shown).

*The door switch (Figures 1 and 16 to 21)*

Figures 16, 17, 18, 19, 20, 21:
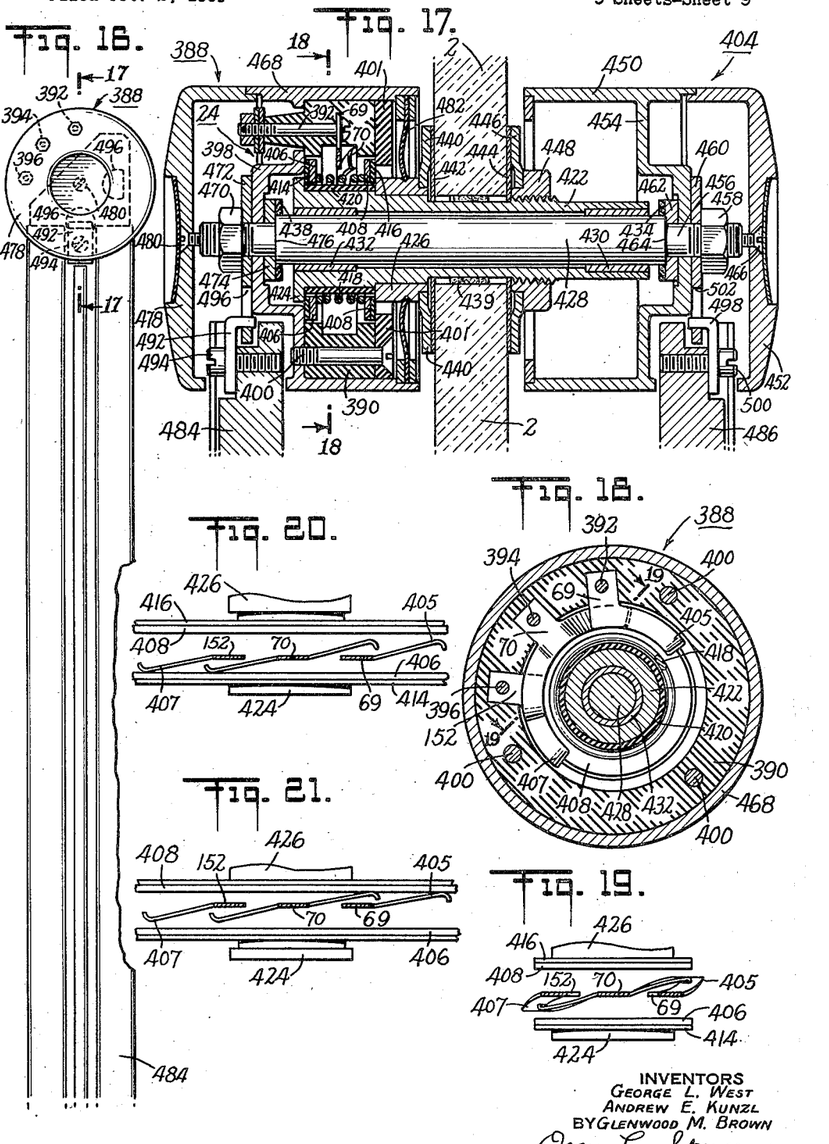
Figure 16 is a partial elevational view of a handle of the door of Figure 1 having a control switch concealed therein.
Figure 17 is an enlarged partial sectional view taken along line 17—17 of Figure 16 showing portions of the door handles on each side of the door and the switch mechanism housed therein.
Figure 18 is a sectional view taken along line 18—18 of Figure 17 showing contact elements of the door switch.
Figure 19 is a simplified partial sectional view taken along line 19—19 of Figure 18 showing the relative positions of the contact elements.
Figure 20 is a diagrammatic representation of the switch elements for assisting in the explanation of the operation.
Figure 21 is a view similar to Figure 20 showing the switch elements in another operating position.

As shown in Figures 17 and 18, the contacts 69, 70 and 152 of the door switch 24 are positioned within an inside knob, generally indicated at 388, forming a portion of the inside door handle 13 shown in perspective in Figure 1. These three contacts 69, 70, and 152 are supported in spaced relationship by an annular insulating block 390 by means of terminal bolts 392, 394, and 396, respectively, and the insulating block 390 in turn is secured to a cup-shaped spider or web portion 398 of the inside knob 388 by machine screws 400 and a clamping ring 401 so as to be an integral part of the inside knob 388 and to move therewith.

The insulating block or ring 390 is arranged to move relative to the door 2 whenever either of the door handles is pulled or pushed. The three contacts 69, 70, and 152 are carried by and move with the insulating block 390. These contacts are arranged so that as they are moved in one direction, a flexible portion of the contact 69 and of the contact 70 each strike a fixed conductive abutment to close the circuit. Likewise, when the group of contacts is moved in the opposite direction, by movement of the insulating block 390, the contact 152 and contact 70 each strike a fixed conductive abutment.

The contacts 69, 70, and 152 are fabricated in the form of curved strips of resilient metal, such as Phosphor bronze, and each is provided with an outwardly-extending radial tab which extends into the insulating supporting block 390 to which it is secured by its respective terminal bolt 392, 394, or 396. The three contact strips are positioned in spaced relationship axially of the supporting block 390 and extend arcuately along but spaced from a portion of the inner surface of the block 390.

These contact strips do not lie along an axial path of the block 390 but are displaced or off-set so that the outside contacts 69 and 152 overlie opposite ends of the center contact strip 70.

The operation of the door switch 24 will be made clearer by reference to the simplified representations of Figures 19 and 20 and 21, Figures 20 and 21 showing the annular members in somewhat distorted form. As shown in Figure 19, the door knob 388 is in its neutral position, which it assumes when no pressure is being applied to either of the door handles 13 or 14. It is seen that one end of the center contact strip 70 overlaps a bowed portion of the contact strip 69. If pressure is exerted on an outside knob, generally indicated at 404, forming a portion of the outside door handle 14, or pulls on the inside knob 388, then the knobs 388 and 404 are caused to move toward the left, as viewed in Figure 17, causing the three contact strips to move downwardly in the diagrammatic representation of Figures 19 and 20. The ends of the contact strips 152 and 70 then strike an annular conductive stop or washer 406. When these two contacts 69 and 70 come in contact with washer 406, an electrical circuit is completed between the terminal bolts 392 and 394 which are suitably secured to the door switch leads 74 and 82, thus controlling the operation of the central control unit 23, as explained previously.

If someone presses on the inside knob 388 or pulls on the outside knob 404 causing the knobs 388 and 404 to move toward the right as seen in Figure 17, then the ends (Figure 21) of the contact strips 69 and 70 strike an annular conductive stop or washer 408, thus completing an electrical circuit between the terminal bolts 394 and 396.

The annular stops 406 and 408 (Figure 17) are backed by insulating washers 414 and 416, respectively, and are held apart by a restoring spring 418, which acts to return the handles 13 and 14 to the neutral position, whenever no external force is being applied, as explained below. An insulating bushing 420 serves to insulate the conductive stops 406 and 408 and the spring 418 from a main tubular bearing support 422 by which the handles 13 and 14 are mounted on the door 2. The spring 418 presses the stop 406 against a flange 424 on the support 422, and the stop 408 presses against a collar 426 carried by the support 422.

A slidable door knob shaft 428 extends through a pair of sleeves 430 and 432 carried in the ends of the suport 422, the shaft 428 serving to hold the knobs 388 and 404 in a fixed spaced relationship, but permitting these knobs to be pushed in or pulled out a slight distance, relative to the door 2, under the gentle pressure of a person's hand.

When the outer knob 404 is pushed inwardly, to the left as viewed in Figure 17, it moves the shaft 428 which in turn moves the inner knob 388 and the clamping ring 401 which in turn presses against the stop 408, compressing the spring 418 toward the flange 424 until a resilient bumper washer 434 within the knob 404 abuts the outer end of the tubular support 422. When this pressure is removed from the outer knob 404, the restoring spring 418 expands against the clamping ring 401 moving handles 13 and 14 back toward the neutral position, until it has returned the stop 408 to its position against the collar 426, at which time the handles 13 and 14 are in their original neutral position.

It is seen that if the inner knob 388 is pushed, the spider or web portion 398 presses against the stop 406 which compresses the restoring spring 418 toward the collar 426 until a resilient bumper 438 within knob 388 has abutted the flanged end of the tubular support 422. When the force is removed from the inner knob 388, the restoring spring 418 expands against the web 398 moving handles 13 and 14 until the stop 406 is again resting against the flange 424 on the main support 422, at which time the handles 13 and 14 are again in neutral position.

In order to mount the handles 13 and 14 on the door 2, the tubular support 422 is positioned within a resilient bushing 439, in a hole in the door 2. On the inside of the door 2, a dished washer 440 is mounted against an annular shoulder on the collar 426 and presses against a felt gasket 442 on the surface of the door 2. Another gasket 444 and another dished washer 446 are positioned on the opposite side of the door, the assembly being maintained in compression by a nut 448 in threaded engagement with the tubular support 422.

The cover of the outer knob 404 comprises an inner cylindrical portion 450 and an outer cap portion 452. A partition or web 454 is formed integrally with the cylindrical portion 450 and is provided with a central opening that fits over a reduced threaded end portion 456 of the shaft 428. The knob 404 is secured to the shaft 428 by a nut 458 which is threaded on the reduced end portion of the shaft 428 to hold a bar-supporting plate 460, the web 454, and an annular spacer 462 in compression against a shoulder 464 on the shaft 428. The cap portion 452 is secured to the shaft 428 by means of a machine screw 466.

On the inner side of the door 2, the construction of the knob 388 is the same as that of the outer knob 404, except for the modifications necessitated by the door switch assembly.

The cylindrical portion 468 of the inner knob cover is supported by the web 398 which is secured to the inner end of the shaft 428 by a nut 470 which compresses a bar-supporting plate 472, the web 398, and an annular spacer 474 against a shoulder 476 on the shaft 428. The inner cap portion 478 of the knob 388 is secured to the end of shaft 428 by a screw 480. An annular diaphragm 482 of resilient material is positioned between the collar 426 and the inner end of the cylindrical cover portion 468 to provide a dust cover for the switch assembly.

As shown in Figure 1 inner and outer vertical bars 484 and 486 are positioned, respectively, on the inner and outer sides of the door and form portions of the door handles 13 and 14. These bars are pivotally connected at the lower end with a lower door frame 487 and are movably or yieldably supported on the door 2, as by supports 488 and 490, so that the bars can be moved a limited distance relatively to the door 2.

At its upper end, the inner vertical door-operating bar 484 (Figures 17 and 18) is connected to the knob 388 by a hook member 492 secured to the bar 484 by a screw 494 and which extends through an opening 496 in the plate 472. This connection is arranged so that a slight rotational movement of the bar 484 is permitted relative to the knob 388, but the horizontal component of the movement of the bar is transferred to the knob 388 to actuate the switch 24 as described above.

The other vertical bar 486 is connected to the knob 404 in a similar manner by a hook member 498 secured to the bar 486 by a screw 500 and which extends through an opening 502 in the plate 460.

From the foregoing, it will be apparent that the power-driven door embodying the invention is well adapted for the attainment of the ends and objects hereinbefore set forth, the illustrated embodiment being set forth for the purpose of explaining the principle and construction in compliance with the requisite statutes so that others will be enabled to construct the apparatus and to modify it in accordance with the requirements of each particular use.

It will be clear that certain features of the invention may be used at times to advantage without a corresponding use of other features and that certain of the functions of the apparatus may be performed with other equivalent constructions. For example, although an electronic time delay circuit has been shown and described, it will be apparent to those familiar with this field that other devices for measuring elapsed time can be employed. Similarly, various modifications of the hydraulic system can be made depending upon the particular use. It will be apparent, also, that certain of the details have been set forth for the purpose of describing a complete unit, thus, the hydraulic system is described as using oil as the hydraulic fluid although it will be obvious that other materials, such as alcohol, ethylene glycol, or glycerine, could be use.

What is claimed is:

1. In a system for the power operation of a door arranged to swing from a closed position in either of two directions, apparatus comprising a driving member, a driven member connectible to said door, reversible power transfer means for transferring power from said driving member to said driven member to open said door in either of two directions, and selective control means responsive to the initial displacement of said door in either of two directions from its closed position arranged to condition said power transfer means for the application of force to said door to open it in the direction of the initial displacement.

2. In a power operated system for applying power to a door, a driving unit comprising a movable member having a neutral position and being displaceable in either of two directions from said neutral position, force-generating means, force-transferring means coupled to said movable member and to said force-generating means, said force-generating means being arranged to move in a direction transverse to both of said directions of displacement when said movable member is in its neutral position, and manual means for displacing said member in either of two directions from its neutral position, said force-transferring means being responsive to the manual displacement of said member and arranged to apply a component of said force to said member in the direction of its initial displacement from the neutral position.

3. In a power driving system for opening a door from its closed position in either of two directions, apparatus comprising a door, a source of power for opening said door, a driven element connected to said door and movable along a continuous path extending from a first limit position through a neutral position to a second limit position, and a driving element coupled to said source of power and to said driven element and movable between first and second prefixed limit positions, said coupling between said driven and driving elements being such that said driven member is in its neutral position whenever said driving member is in its first of said pre-fixed limit positions.

4. In a power-driven door-operating system, apparatus comprising, a door having closed and open positions, a source of power, a driven element connectible to said door and movable along a path from a first extreme position through a neutral position to a second extreme position, and a driving member engaging said driven element and movable along a rectilinear path between first and second limits, the path of said driving member being perpendicular to the path of said driven element at the neutral position and at an angle less than perpendicular at other positions of said driving element, whereby the driving member can produce a component of force along the path of the driven element only when said driven element is displaced from its neutral position.

5. In a power-driven system for opening a door, apparatus comprising a door having open and closed positions, a driving member, first cam-driving means for transferring power from said driving member to said door to open it in a first direction, second cam-driving means for transferring power from said driving member to said door to open it in a second direction, and selective control means responsive to the manual displacement of said door from its closed position arranged to render operative the one of said cam-driving means arranged to apply opening force to said door in the direction of its manual displacement.

6. In a power-driven system for opening a door, apparatus comprising a door having open and closed positions, a driving member, first cam-driving means having a first cam surface for transferring power from said driving member to said door to open it in a first direction, second cam-driving means having a second cam surface for transferring power from said driving member to said door to open it in a second direction, and a cam-engaging member movable relatively to said first and second cam surfaces in synchronism with the opening and closing movements of said door, said cam-engaging member being arranged to engage said first cam surface when said door is displaced manually in a first direction from its closed position, to engage said second cam surface when said door is displaced in said second direction from its closed position, and drive means responsive to the displacement of said door from its closed position to cause said drive members to force said cam-engaging member against the one of said cam surfaces with which it is engaged whereby said system applies opening force to said door in the direction of its initial manual displacement.

7. In a power system for opening a door in either of two directions from its closed position, apparatus comprising a door having open and closed positions, a driving member, a driven member connectible to said door, reversible cam-driving means for transferring power from said driving member to said driven member to open said door in either of two directions, said cam-driving means including two cam surfaces and a cam-engaging element arranged to cooperate with one of said cam surfaces to apply opening force to said door in one direction and with the other cam surface to apply opening force in the other direction, and selective control means responsive to the manual displacement of said door from its closed position arranged to position said cam-engaging element in operative relationship with the one of said cam surfaces arranged for the application of force to said door to open it in the direction of its displacement.

8. In a power-driven door-operating system, apparatus comprising a door having open and closed positions, a source of hydraulic power, a piston driven by said power source, reversible power transfer means for transferring power from said piston to said door to open said door in either of two directions, and means responsive to the initial displacement of said door from its closed position arranged to condition said power transfer means for the application of force to said door to open it in the direction of the initial displacement.

9. In a power system for opening a door in either of two directions, a driving system comprising, a door-driving member, means rotatably supporting said member, a cam connected to said member and having an annular cam surface formed by two adjoining convex cam surface portions, said cam surface having diametrically opposed peaks, a pair of rollers, a movable member rotatably supporting said rollers adjacent diametrically opposed portions of said cam surface, and means responsive to the displacement of said rollers from dead center position relative to said cam surface for applying force to said member to move said rollers toward said cam surface thereby to cause said cam and said door-driving member to rotate.

10. In a power-driven mechanism for operating a door, apparatus comprising a power unit for applying opening force to said door, manually-operable control means mounted on said door and having "off" and "on" positions, electrical distribution means responsive to the displacement of said door from a predetermined position, and power unit actuating means under the joint control of said control means and said distribution means for controlling the application of opening force to said door by said power unit.

11. In a system for the power operation of a door, apparatus comprising a door pivotally mounted to swing between closed and open positions, manually operable switch means mounted on the door, an electrically operated power source for moving said door between its closed and open positions, position-responsive connection means under the control of said door, and a partially-completed electrical circuit extending between said switch and said door, said power source being arranged to be controlled by said switch means upon the completion of said circuit therebetween, said position-responsive means being arranged to complete said electrical connection only when said door is displaced from its closed position.

12. In a power-driven door-operating system for opening a door, apparatus comprising a door movable between open and closed positions, a source of power, a driven member connectible to said power source and to said door, and an electric circuit for controlling the application of power from said source to said door including manually-operable switch means carried by said door, and door-displacement switch means responsive to the displacement of said door from its closed position, said circuit being arranged to be partially completed by the actuation of said manual switch means and to be completed for the application of power to said door by said door-displacement switch means only upon the displacement of said door from its closed position.

13. In a power-driven door-operating system for opening a door, apparatus comprising a door movable between open and closed positions, a source of power, a driven member connectible to said power source and to said door, an electric circuit for controlling the application of power from said source to said door including manually-operable switch means carried by said door, and door-displacement switch means responsive to the displacement of said door from its closed position, said circuit being arranged to be partially completed by the actuation of said manual switch means and to be completed for the application of power to said door by said door-displacement switch means only upon the displacement of said door from its closed position, and time-delay means arranged to maintain the application of power to said door for at least a predetermined interval after the completion of said electric circuit.

14. In a power-driven door-operating system for opening a door, apparatus comprising a door movable between open and closed positions, a source of power, a driven member connectible to said power source and to said door, an electric circuit for controlling the application of power from said source to said door including first manually-operable switch means carried by said door, and door-displacement switch means responsive to the displacement of said door from its closed position, said circuit being arranged to be partially completed by the actuation of said manual switch means and to be completed for the application of power to said door by said door-displacement switch means only upon the displacement of said door from its closed position, time-delay means arranged to maintain the application of power to said door for at least a predetermined interval after the completion of said electric circuit, and second manually-operable switch means carried by said door and arranged upon actuation thereof to interrupt the application of power to said door irrespective of the operation of said time delay means.

15. In a power-driven mechanism for operating a door arranged to swing from a closed position in either of two directions, apparatus comprising a power unit for applying opening force to said door, first and second manually-operable circuit control means mounted on said door, a door-operating circuit for energizing said power unit, a safety circuit for de-energizing said power unit, and electrical distribution means responsive to the displacement of said door in a first direction to connect said first circuit control means into said door-operating circuit and said second circuit control means into said safety circuit, said distribution means being responsive to the displacement of said door in a second direction to connect said first circuit control means into said door-operating circuit and said second circuit control means into said safety circuit.

16. In a power-driven door-operating system, apparatus comprising a door having open and closed positions, a source of door-operating power, a cyclic control mechanism arranged to control the application of power to said door, said control mechanism including a first switch means for applying power to said door, and time-delay means for maintaining the application of power to said door for a predetermined interval, and second manually-operable switch means carried by said door arranged to interrupt the application of power to said door at any time during the operating cycle and to interrupt the operation of said time-delay means.

17. In a power-driven system for opening a door, apparatus comprising power-driving means for applying door-opening force to said door, manually controllable switch means carried by said door and having energizing and off positions, energizing means under the control of said manually controllable switch means arranged to start said power driving means when said manually controllable means is in its energizing position, and time-delay means responsive to the movement of said manually controllable means from its energizing to its off position arranged to maintain the operation of said power driving means for predetermined interval thereafter.

18. In a power-driven system for opening a door, apparatus comprising power-driving means for applying door-opening force to said door, manually controllable means carried by said door and having off and energizing positions, energizing means under the control of said manually controllable means arranged to start said power-driving means when said manually controllable means is in its energizing position, electrical time-delay means responsive to the movement of said manually controllable means from its energizing to its off position arranged to maintain the operation of said power-driving means for a predetermined interval thereafter, and means for adjusting the operating interval of said time-delay means from substantially zero to a predetermined maximum limit.

19. In a power-driven system for opening a door, apparatus comprising power-driving means for applying door-opening force to said door, manually-controllable means carried by said door and having off and energizing positions, energizing means under the control of said manually controllable means arranged to start said power-driving means when said manually-controllable means is in its energizing position, electrical time-delay means responsive to the movement of said manually-controllable means from its energizing to its off position arranged to maintain the operation of said power-driving means for a predetermined interval thereafter, and spring means opposing the opening force of said door and arranged to close said door whenever said door-opening force is not being applied.

20. In a power-driven system for opening a door, apparatus comprising a source of hydraulic power for applying door-opening force to said door, manually-controllable means carried by said door and having off and energizing positions, energizing means under the control of said manually controllable means arranged to apply said hydraulic power to said door when said manually-controllable means is in its energizing position, time-delay means responsive to the movement of said manually-controllable means from its energizing to its off position arranged to maintain the operation of said power-driving means for a predetermined interval thereafter, and means responsive to the opening movement of said door arranged to reduce the hydraulic force applied to said door to an amount just sufficient to hold it in an open position during the operation of said time-delay means.

21. In a power-driven system for opening a door, apparatus comprising power-driving means for applying door-opening force to said door, manually controllable means carried by said door and having off and energizing positions, energizing means under the control of said manually controllable means arranged to start said power-driving means when said manually controllable means is in its energizing position, time-delay means responsive to the movement of said manually controllable means from its energizing to its off position arranged to maintain the operation of said power-driving means for a predetermined interval thereafter, spring means for closing said door at the termination of said time interval, hydraulic means for limiting the closing speed of said door including an orifice and means for forcing liquid therethrough under the pressure of said spring means, and means for reducing the size of said orifice as said door nears its closed position.

22. Door-operating apparatus of the type which comprises a door, first and second handles movably supported on opposite sides of said door, handle-connecting means extending through said door and connecting said handles for movement in unison relative to said door, switch means within said handles arranged to be operated by movement thereof relative to said door, and a driving mechanism under the control of said switch means for applying opening force to said door, wherein said switch means includes first, second, and third switch contact members movable with said handles relative to said door, and conductive stop means, said first and second contact members being arranged to strike said stop means to complete an electrical circuit therebetween when said handles are moved in a first direction, and said second and third contact members being arranged to strike said stop means to complete an electrical circuit therebetween when said handles are moved in a second direction.

23. In a system for the power operation of a door arranged to swing from a closed position to an open position, apparatus comprising a driving member, a driven member connectable to said door, power transfer means for transferring power from said driving member to said driven member to open said door, and selective control means responsive to the initial displacement of said door to the open position from its closed position arranged to condition said power transfer means for the application of force to said door to open it farther than the amount provided by the initial displacement.

24. In a power-driven mechanism for operating a door, apparatus comprising a power unit for applying opening force to said door, manually-operable control means having "off" and "on" positions, electrical distribution means responsive to the displacement of said door from a predetermined position, and power unit actuating means under the joint control of said control means and said distribution means for controlling the application of opening force to said door by said power unit.

25. In a system for the power operation of a door arranged to swing from a closed position to an open position, apparatus comprising a driven member connectable to said door, an hydraulic motor including a driving member and means for transferring power from said driving member to said driven member to open said door, said hydraulic motor having a power chamber connectable to a hydraulic power source for producing a relatively high pressure within said power chamber, said motor also having a return chamber connecting with a relatively lower pressure return passageway for causing a relative lower pressure in said return chamber, the pressure differential existing within the chambers of said motor serving to move said driving member, selective control means responsive to the initial displacement of said door to the open position from its closed position arranged to condition said hydraulic motor for the application of force to said door to open it farther than the amount provided by the initial displacement, and valve means arranged to reduce said pressure differential as the door moves toward its open position.

26. In a system for the power operation of a door arranged to swing from a closed position to an open position, apparatus comprising a driven member connectable to said door, a cylinder, a piston slidably mounted within said cylinder for movement between pre-set limits, means for transmitting motion from said piston to said driven member, a source of hydraulic power, means for conducting hydraulic fluid from said hydraulic power source to said cylinder, valve means arranged to conduct the fluid from said cylinder to reduce the hydraulic pressure therein, said valve means being responsive to the position of said piston in said cylinder to increase the opening through said valve as the piston approaches one of said limits, and selective control means responsive to the initial displacement of said door to the open position from its closed position arranged to permit flow of hydraulic fluid from the hydraulic power source to said cylinder through said conducting means for the application of force to said door to open it farther than the amount provided by the initial displacement.

References Cited in the file of this patent
UNITED STATES PATENTS

| | | |
|---|---|---|
| 358,977 | Joyner et al. | Mar. 8, 1897 |
| 766,410 | Alger | Aug. 2, 1904 |
| 925,956 | Scott | June 22, 1909 |
| 965,009 | Philbrick | July 19, 1910 |
| 1,134,325 | Flint | Apr. 6, 1915 |
| 1,674,662 | Rowntree | June 26, 1928 |
| 1,700,433 | Cox | Jan. 29, 1929 |
| 1,744,069 | Dapron | Jan. 21, 1930 |
| 1,832,618 | Conklin | Nov. 17, 1931 |
| 1,929,273 | Crago | Oct. 3, 1933 |
| 1,949,645 | Conklin | Mar. 6, 1934 |
| 2,168,152 | Brauchler | Aug. 1, 1939 |
| 2,212,998 | Crane | Aug. 27, 1940 |
| 2,276,338 | Potter et al. | Mar. 17, 1942 |
| 2,298,542 | Potter et al. | Oct. 13, 1942 |
| 2,301,175 | Earnshaw et al. | Nov. 10, 1942 |
| 2,343,316 | Newkirk | Mar. 7, 1944 |
| 2,368,722 | Newkirk | Feb. 6, 1945 |
| 2,552,624 | Enzenbacher | May 15, 1951 |
| 2,564,067 | Karp | Aug. 14, 1951 |
| 2,574,684 | Andrews et al. | Nov. 13, 1951 |
| 2,578,810 | Kilar et al. | Dec. 18, 1951 |
| 2,586,442 | Seagren | Feb. 19, 1952 |
| 2,606,022 | Vander Veer et al. | Aug. 5, 1952 |
| 2,646,981 | Bassett et al. | July 28, 1953 |
| 2,676,796 | Meyerholz | Apr. 27, 1954 |